March 21, 1933.　　　C. G. SHEPHERD　　　1,902,669
ARTICLE DELIVERY DEVICE
Filed Oct. 20, 1932　　　2 Sheets-Sheet 1
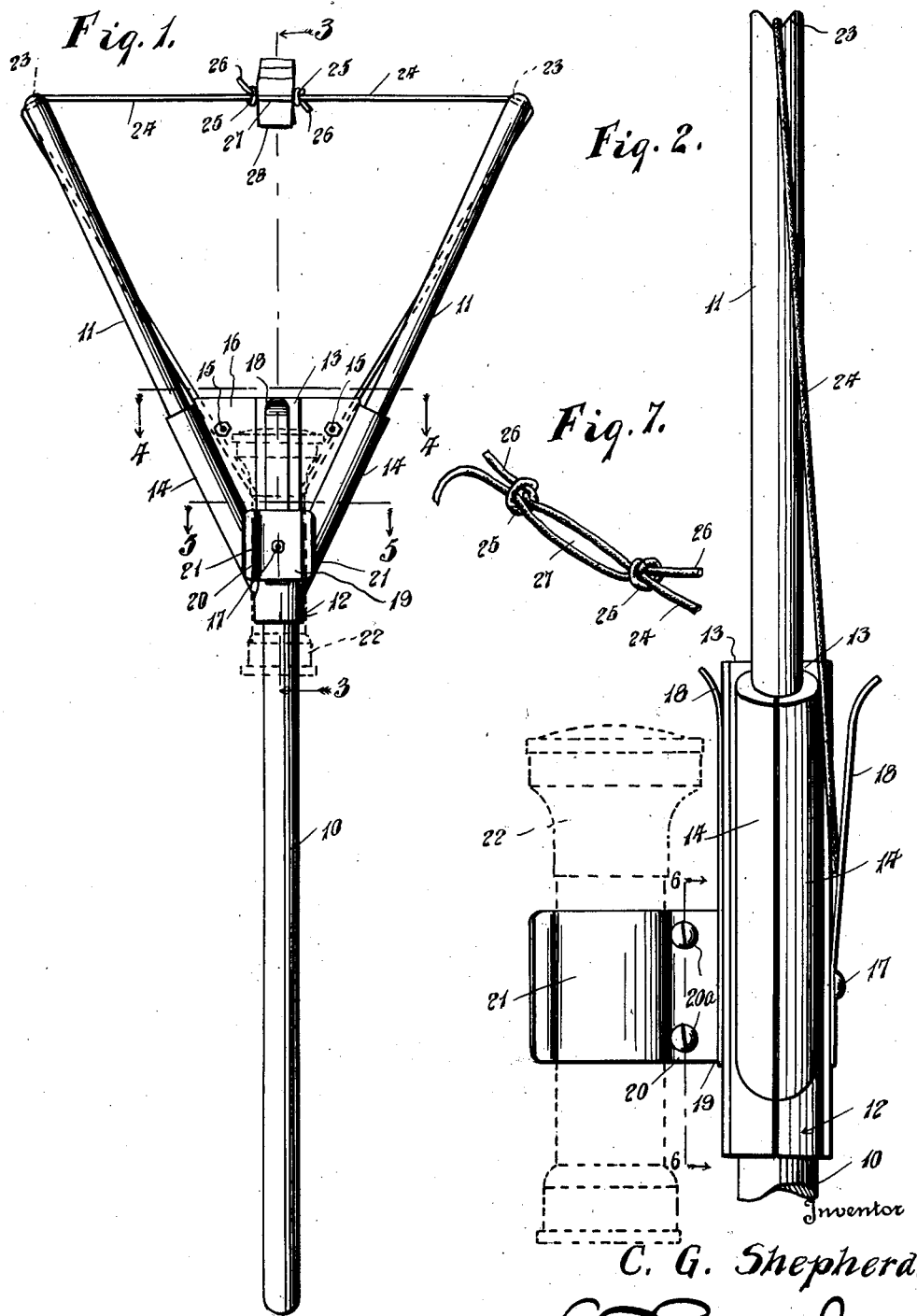
Inventor
C. G. Shepherd.
By L. F. Rudruph Jr.
Attorney

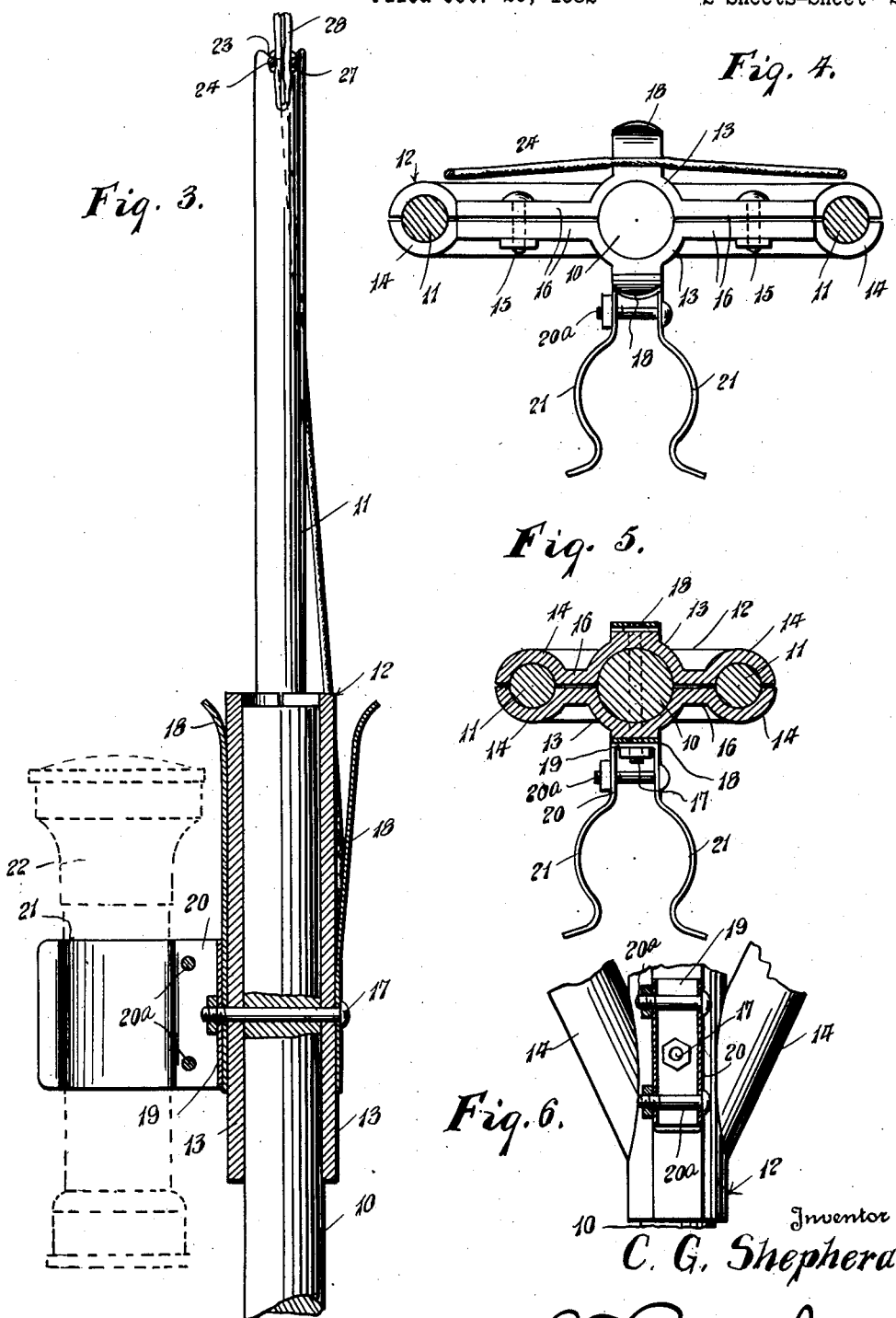

Patented Mar. 21, 1933

1,902,669

UNITED STATES PATENT OFFICE

CHESTER G. SHEPHERD, OF FREEPORT, ILLINOIS

ARTICLE DELIVERY DEVICE

Application filed October 20, 1932. Serial No. 638,812.

The invention relates to devices for delivering messages, and small articles to rapidly moving vehicles, such for instance as railway trains, racing automobiles, and the like, and has for its object the provision of a device adapted to hold the message or other article in a convenient position for seizure by a railway trainman or occupant of a rapidly moving motor vehicle, and to securely hold the article while being delivered, and means provided whereby the message or article may be readily removed from the holding device after the article has been delivered to the train or motor vehicle.

A further object of the invention is the provision of an article delivery device formed of separable and replaceable units, admitting of the device being knocked down for shipment and storage in the minimum amount of space.

A further object of the invention is the provision of means whereby the article and its holding device may be illuminated for night delivery of messages and other articles.

The invention will be described in detail hereinafter and will be found illustrated in the accompanying drawings in which Figure 1 is a front view in elevation of the improved article delivery device, Figure 2 is a fragmentary view on an enlarged scale of one edge of the device, Figure 3 is a sectional view on an enlarged scale on a plane indicated by the line 3—3 of Figure 1, Figures 4 and 5 are transverse sectional views on planes indicated by the lines 4—4 and 5—5, respectively of Figure 1, Figure 6 is a sectional detail on a plane indicated by the line 6—6 of Figure 2, and Figure 7 is a fragmentary detail of the article holding device.

In the drawings, similar reference characters are used to designate corresponding parts in all of the views.

The device is primarily intended for delivering train orders to officials on moving trains from station platforms, but also adapted for use for delivering messages to the crew of racing motor vehicles, or other rapidly moving objects, and may also be used for delivering small articles to trainmen or to motor vehicles, such for instance as lunches, beverages, etc. to racing crews to obviate the necessity of stopping for messages, and the articles that may be delivered, and comprises a Y-shaped frame that is best shown in Figure 1, having a hand staff 10 and outwardly deflected arms 11, secured in a two part head 12. The head 12 comprises two members having semicylindrical recesses to receive the staff 10 and arms 11, respectively, the oppositely disposed recesses for the staff 10 being designated 13, and for the arms 11 the recesses are designated 14. The two parts of the head 12 are held in clamping engagement with the staff 10 and arms 11 by means of threaded bolts 15 secured through webs 16, and by means of the threaded bolt 17 extended through the walls of the recesses 13 and the staff 10. The bolt 17 also serves to hold spring tongues 18 secured to opposite sides of the head 12, and clamps the base 19 of spring arms 20 to said head, said spring arms 20 having arcuate portions 21 that are adapted to enclose the shaft of an electric flashlight 22 as shown in Figures 2 and 3.

As also shown in Figures 2 and 3 the arcuate portions 21 are arranged so that the beam of light from the flashlight 22 is thrown between the ends of the arms 11 for the purpose to be hereinafter particularly referred to. The tension of the spring arms 20 is adapted to be adjusted by means of bolts 20ª so that the electric flashlight will be firmly held in relationship with the head 12.

The staff 10 is preferably made of substantially rigid material, such for instance as wood, the arms 11 are preferably made of elastic material, such as rattan, or stiff rubber or the like, while the two part head 12 may be formed of metal of other suitable material such for instance as bakelite or other fibrous product.

The outer free ends of the arms 11 are notched as shown at 23 to receive a flexible element such for instance as a reasonably heavy twine or cord 24, said flexible element being mounted in the position shown in Figures 1, 2 and 3 of the drawings, engaging in said notches 23 and being engaged by one or the other of the spring tongues 18. The ends of the flexible element 24 are connected together by means of slip nooses 25 formed at a slight distance from the terminals 26 of the element, and each noose is slidably mounted on the opposite end of the element so as to form an adjustable loop 27 to enclose the message or other article suggested at 28.

In use the message 28 is first inserted in the loop 27 and then the flexible element is mounted on the Y-shaped frame by engaging in the notches 23 and under one of the spring tongues 18. The message or other article is then ready for delivery to the trainman or occupant of a racing motor vehicle or the like by holding it by means of the Y-shaped frame adjacent to and in convenient position for slipping the arm of the receiver through the opening formed between the clamping arms 11 and the portion of the flexible element 24 between the arms 11.

It will be apparent that the engagement of the flexible element 24 by the spring tongue 18 will provide a slight resistance to removal of the flexible element 24 from the spring and this resistance will result in the slip nooses 25 being more securely engaged with the message or other article to hold it tightly clasped in the loop 27 so that danger of loss of the package or other article by dropping off or away from the element 24 will be practically negatived. By providing the arms 11 of elastic material as described, provision is made whereby should there be delay in the removal of the element 24 by the tongue 18 engaging it, that they will be sprung inwardly to quickly release the flexible element from the ends of the arms 11, and a continuous pull will result in releasing the element from the tongue.

By providing the spring clamping member including the arms 20 for holding an electric flashlight 22, as hereinbefore described, it will be apparent that the device is adapted for use in connection with delivering messages and other articles at night, the flashlight being so arranged, as hereinbefore described, that the beam of light therefrom will be thrown directly on the message or other article and the holding means and thus insure delivery of the message or other article to the moving vehicle.

It will be understood, however, that the flashlight and means for holding it on the device is not essential to the operation of the article and that the spring clamping member may be omitted without affecting the usefulness of the invention.

What is claimed is:—

1. In an article delivery device, a staff, arms mounted on said staff and arranged at an angle thereto, a two-part separable head member provided with grooved recesses to receive said staff and arms and to clamp them in position, a flexible member adapted to hold an article and engageable with the ends of said arms, and a spring clamp on said head engageable with said flexible member to maintain it taut and in position.

2. In an article delivery device, a staff, arms mounted on said staff arranged at an angle to the staff and having their outer ends notched, a two-part separable head member provided with mating grooved recesses to receive adjacent ends of said staff and arms to clamp them in the positions stated, a spring clamp secured to said head, and a flexible member mounted in said notches and secured therein by said spring clamp, the ends of said flexible member being connected to one another by running nooses and providing a loop to hold an article for delivery.

3. In an article delivery device, a staff, arms mounted on said staff arranged at an angle to said staff, a two-part clamping head having mating grooved recesses receiving and clamping said staff and arms in position, and means to hold an article between the ends of the angularly disposed arms.

In testimony whereof I affix my signature.

CHESTER G. SHEPHERD.